United States Patent [19]
Van Laeken

[11] Patent Number: 6,161,697
[45] Date of Patent: Dec. 19, 2000

[54] APPARATUS FOR DISPENSING SANDWICH PANEL INSERTS

[75] Inventor: Howard J. Van Laeken, Seattle, Wash.

[73] Assignee: The Boeing Company, Seattle, Wash.

[21] Appl. No.: 09/249,546

[22] Filed: Feb. 12, 1999

[51] Int. Cl.$^7$ ................................................. B65D 83/04
[52] U.S. Cl. ......................... 206/499; 206/817; 221/279
[58] Field of Search ................................... 206/321, 338, 206/445, 499, 817; 52/704; 221/20, 226, 232, 279, 295, 281; 414/288

[56] References Cited

U.S. PATENT DOCUMENTS

| | | | |
|---|---|---|---|
| 3,032,179 | 5/1962 | Menolasino et al. | 206/817 |
| 3,036,703 | 5/1962 | Menolasino et al. | 206/817 |
| 3,528,466 | 9/1970 | Tracy . | |
| 3,722,671 | 3/1973 | Wright et al. . | |
| 3,854,625 | 12/1974 | Kuebler | 221/279 |
| 3,998,238 | 12/1976 | Nigro | 221/279 |
| 4,415,083 | 11/1983 | Kemkers . | |
| 5,143,216 | 9/1992 | Aurtoi et al. . | |
| 5,617,973 | 4/1997 | Seto et al. | 221/279 |

*Primary Examiner*—Jim Foster
*Attorney, Agent, or Firm*—Brooks & Kushman P.C.

[57] ABSTRACT

An apparatus is provided for dispensing thermoplastic inserts, or other identical pieces, in a manner in which orientation of the individual inserts is properly maintained. The apparatus includes a hollow tube having an internal cavity for housing and guiding a plurality of the inserts aligned one after another therein. The hollow tube has a central axis. A receiving assembly is positioned at an inlet end of the hollow tube and has at least one pivotable blocking member for selectively blocking the inlet end of the hollow tube. A weight assembly is positioned within the hollow tube. The weight assembly has a lower contact surface spanning substantially the entire width of the cavity and abutting against the one of the inserts nearest the inlet end. The weight assembly is configured to maintain a consistent orientation while sliding along the hollow tube such that the lower contact surface remains perpendicular to the central axis, thereby maintaining proper orientation of the plurality of inserts within the hollow tube. A dispensing assembly is provided at an outlet end of the hollow tube.

16 Claims, 3 Drawing Sheets

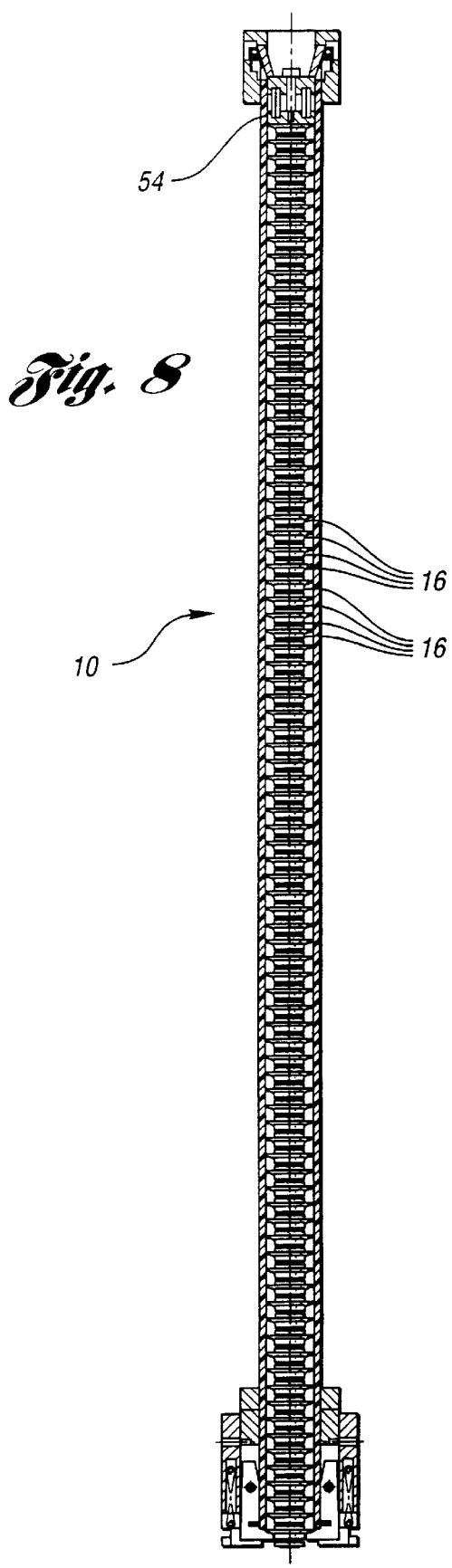
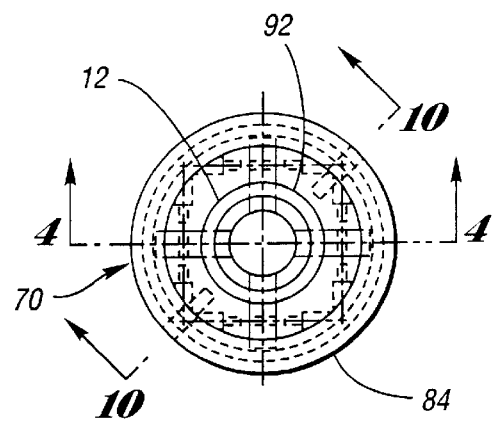
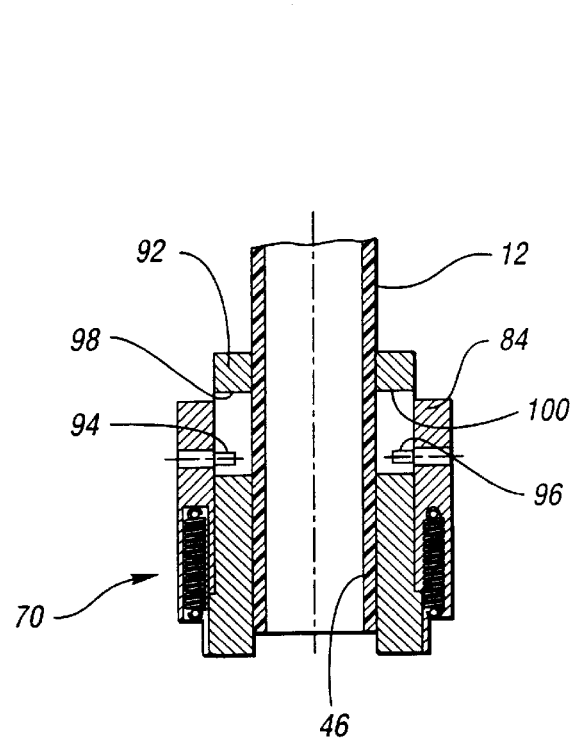
Fig. 8
Fig. 9
Fig. 10

& #x20;

APPARATUS FOR DISPENSING SANDWICH PANEL INSERTS

BACKGROUND OF THE INVENTION

1. Technical Field

The invention relates to an apparatus for dispensing a plurality of sandwich panel inserts, or other pieces, in a manner in which orientation of each insert is properly maintained while the inserts are housed and dispensed.

2. Background Art

Panel inserts anchored within lightweight sandwich panels have been widely used for many years, especially in the aircraft industry where such panels are used to reduce weight.

Prior to installation, such inserts are typically housed within an elongated tube assembly, such as that described in U.S. Pat. No. 3,722,671. A common problem experienced in tube assemblies which house sandwich panel inserts, or any plurality of identical pieces aligned one after another, such as bolts, rivets, fasteners, etc., is that the individual inserts tend to lose their proper orientation within the tube prior to being dispensed from the tube, thereby resulting in jamming of inserts within the tube or creating problems in a "pick and place" operation in which inserts are sequentially grasped as they are dispensed from the end of the tube.

It is therefore desirable to provide an improved apparatus for dispensing identical pieces, such as sandwich panel inserts, in a manner in which proper orientation of the individual pieces are maintained as the pieces are housed and dispensed.

SUMMARY OF THE INVENTION

The present invention overcomes the above-referenced shortcomings of prior art dispensing assemblies by providing a dispensing assembly which includes a weight assembly within a hollow tube, wherein the weight assembly is configured and positioned for compressing the stack of individual pieces together such that each individual piece maintains its proper orientation while housed and dispensed from the hollow tube.

More particularly, the present invention provides an apparatus for dispensing identical pieces, including a hollow tube having an internal cavity for housing and guiding a plurality of the pieces aligned one after another therein. The hollow tube is arranged along a central axis. A receiving assembly is positioned at an inlet end of the hollow tube and includes at least one blocking member for selectively blocking the inlet end of the hollow tube. A weight assembly is slidably positioned within the hollow tube and abuts the one of the pieces nearest the inlet end for compressing the plurality of pieces together to maintain proper orientation of each of the plurality of pieces. A dispensing assembly is positioned at an outlet end of the hollow tube.

Preferably, the weight assembly is spring-loaded against the blocking member when the plurality of pieces substantially fill the hollow tube, thereby further compressing the plurality of pieces together for handling when the tube is full. Also, preferably, the blocking member includes at least one pivotable, finger spring-loaded toward the position blocking the inlet end. The pivotable finger is movable away from the position blocking the inlet end to allow insertion of the pieces into the hollow tube.

Preferably, the dispensing assembly includes at least one pivotable foot for selectively blocking the outlet end and a sleeve slidably positioned around the tube for movement between a closed position securing the foot in the position blocking the outlet end and an open position allowing pivotal movement of the foot away from the position blocking the outlet end.

Objects, features and advantages of the invention are readily apparent from the following detailed description of the best mode for carrying out the invention when taken in connection with the accompanying drawings.

BRIEF DESCRIPTION OF THE DRAWINGS

FIG. 8 shows a longitudinal cross-sectional view of a fully loaded tube assembly in accordance with the embodiment of FIG. 1;

FIG. 9 shows a cross-sectional view taken at line 9—9 of FIG. 1; and

FIG. 10 shows a partial longitudinal cross-sectional view taken at line 10—10 of FIG. 9.

DETAILED DESCRIPTION OF THE INVENTION

Figure 1:
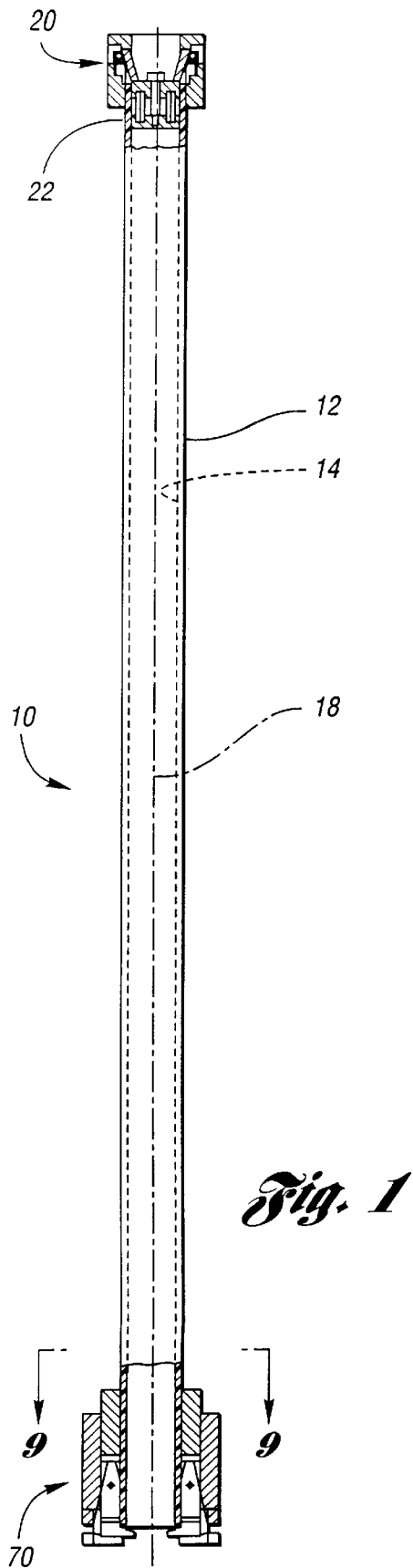
FIG. 1 shows a longitudinal cross-sectional view of a tube assembly in accordance with the present invention.

FIG. 1 shows a longitudinal cross-sectional view of an insert dispensing tube assembly 10 in accordance with the present invention. The insert dispensing tube assembly includes a hollow tube 12 having an internal cavity 14 for housing and guiding a plurality of identical pieces, such as thermoplastic inserts 16 as shown in FIG. 8, aligned one after another therein. The tube 12 includes a central axis 18 therethrough.

Figure 2:
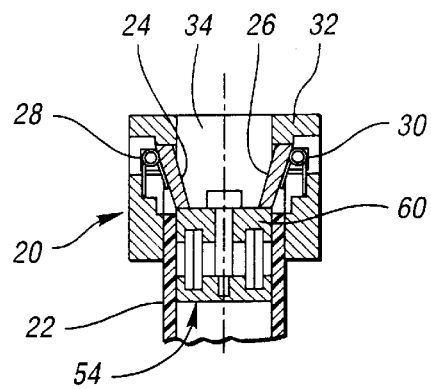
FIG. 2 shows a sectional view taken from FIG. 1.

A receiving assembly 20 is positioned at an inlet end 22 of the hollow tube 12. As shown in FIG. 2, the receiving assembly 20 includes four pivotable fingers, two of which are shown, and act as blocking members operative to block the inlet end 22 of the tube 12. Torsion springs 28,30 pivotally bias the fingers 24,26 toward the position shown in FIG. 2 blocking the inlet end 22 of the tube 12. The fingers 24,26 are pivotable away from the position shown in FIG. 2 against the bias of the springs 28,30 in order to allow insertion of inserts 16 therethrough, as illustrated by the arrows of FIG. 5.

Figure 5:
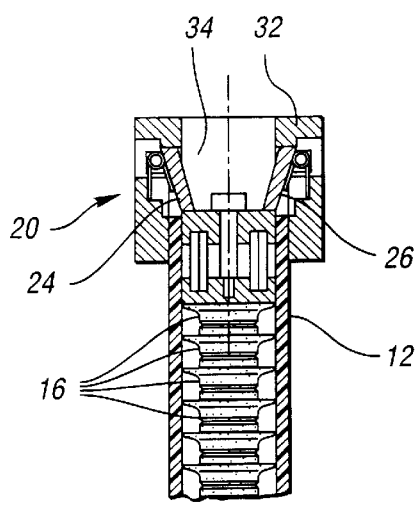
FIG. 5 shows a partial longitudinal cross-sectional view of the receiving end of a loaded tube assembly in accordance with the embodiment of FIG. 1.

As shown in FIGS. 2 and 5, the receiving assembly 20 includes a top fitting 32 for pivotally supporting the fingers 24,26. The top fitting 32 includes an aperture 34 therein for receiving inserts 16 therethrough. Accordingly, inserts 16 are fed through the aperture 34, and into the hollow tube 12 as the fingers 24,26 spread outwardly to allow passage of the inserts 16 therethrough.

Figure 7:
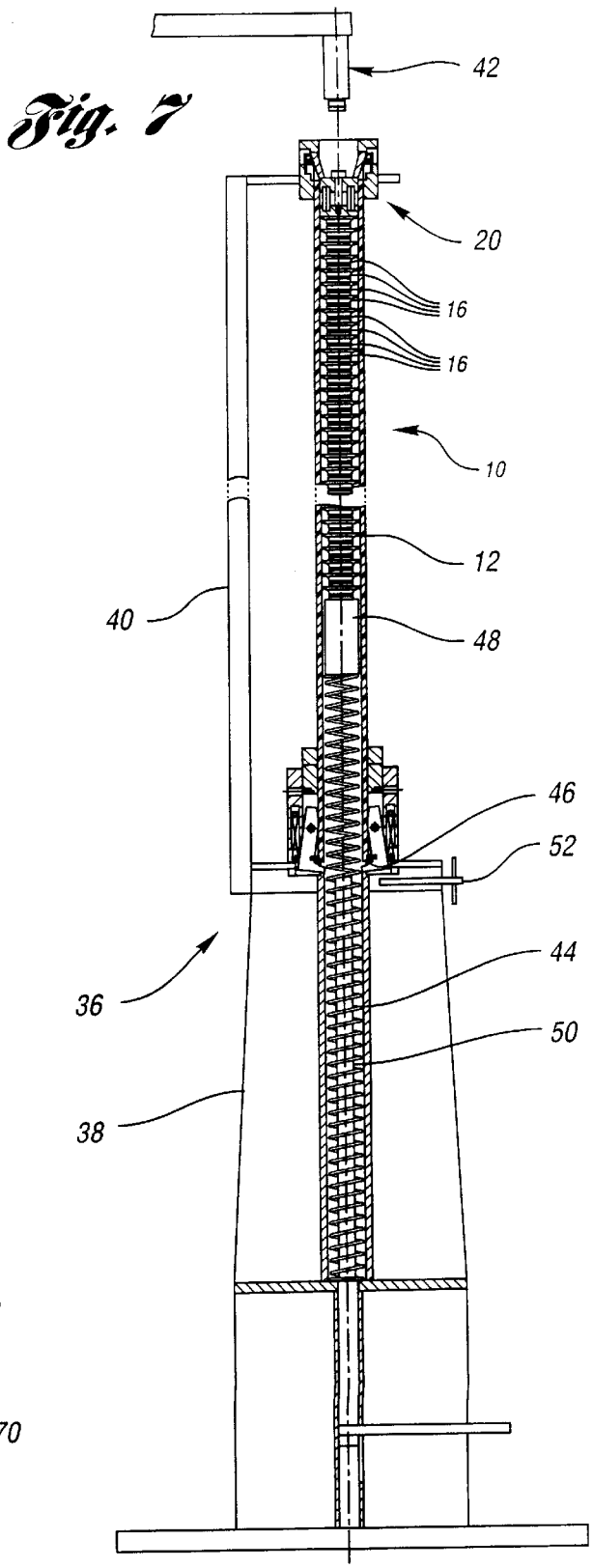
FIG. 7 shows a longitudinal side view of a loader assembly supporting a tube assembly in accordance with the embodiment of FIG. 1.

In order to load the insert dispensing tube assembly 10 with inserts 12, a loader assembly 36 is provided as shown in FIG. 7. As shown, the loader assembly includes a base 38, a brace 40 for supporting the tube assembly 10, and an infeed system 42. The loader assembly 36 further includes a compression spring 44 extendable into the hollow tube 12 through the outlet end 46 of the tube 12 to force the insert platform 48 upward to compress the stack of inserts 16 together as the inserts 16 are inserted through the receiving assembly 20 in order to maintain proper orientation of each individual insert 16. A movable locator bar 50 is provided for rotatably locking within the platform 48 for holding the platform down. Also, a spring lock 52 is provided for locking the compression spring 50 down once the tube 12 has been completely filled with inserts 16.

Figure 3:
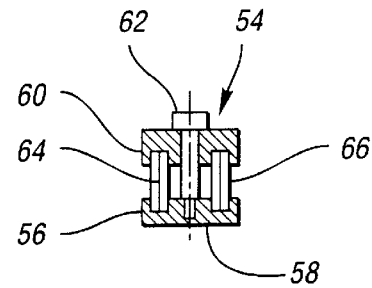
FIG. 3 shows a longitudinal cross-sectional view of the weight assembly as shown in FIG. 1.

When the desired number of inserts 16 have been inserted into the tube assembly 10, a weight assembly 54 is inserted through the receiver assembly 20 on top of the uppermost insert 16. The weight assembly 54 is illustrated in FIGS. 2 and 3. The weight assembly 54 includes a lower portion 56, having a lower contact surface 58 spanning substantially the entire width of the cavity 14, and abutting against the top of the one of the inserts 16 nearest the inlet end 22 of the tube 12. The weight assembly 54 further includes an upper portion 60 movably connected with respect to the lower portion 56 by a shoulder bolt 62. Compression springs 64,66 bias the upper portion 60 away from the lower portion 56.

Accordingly, when the tube assembly 10 is filled with the desired number of inserts, the weight assembly 54 is inserted past the fingers 24,26 of the receiver assembly 20. Once the weight assembly 54 has been loaded against the insert 16 nearest the inlet end 22 of the tube 12, the upper portion 60 of the weight assembly 54 abuts against the fingers 24,26, as shown in FIG. 2. The springs 64,66 of the weight assembly 54 are operative to press the lower portion 56 of the weight assembly 54 downward to compress the stack of inserts 16 within the tube against the dispensing assembly 70, described below, in order to maintain proper orientation of the stack of inserts 16.

The lower contact surface 58 of the weight assembly 54, shown in FIG. 3, is maintained in a position perpendicular to the central axis 18 of the hollow tube 12, thereby maintaining proper orientation of the plurality of insert 16 within the tube 12. Accordingly, when the tube assembly 10 has been fully loaded in the loader assembly 36 shown in FIG. 7, the spring lock 52 holds the compression spring 44 down, and the loaded tube assembly 10 may be removed from the loader assembly 36. The compression springs 64,66 of the weight assembly 54, as well as the weight of the weight assembly 54, compress the loaded stack of inserts 16 against the dispensing assembly 70 of the tube 12, thereby maintaining orientation of the inserts 16 so that the loaded tube assembly 10 may be handled and installed into a feeder assembly without adversely affecting orientation of the stack of inserts 16. The fully loaded tube assembly 10 is illustrated in FIG. 8.

Figure 4:
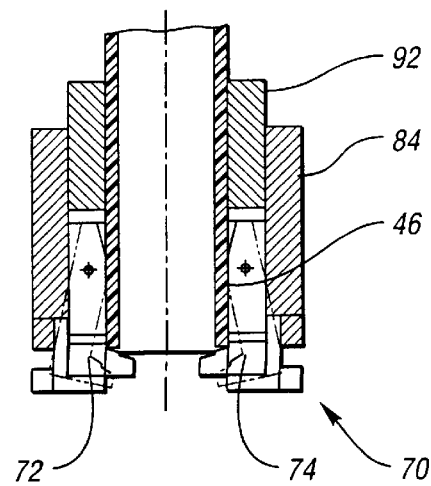
FIG. 4 shows a longitudinal cross-sectional view taken at section 4—4 of FIG. 9.
Figure 6:
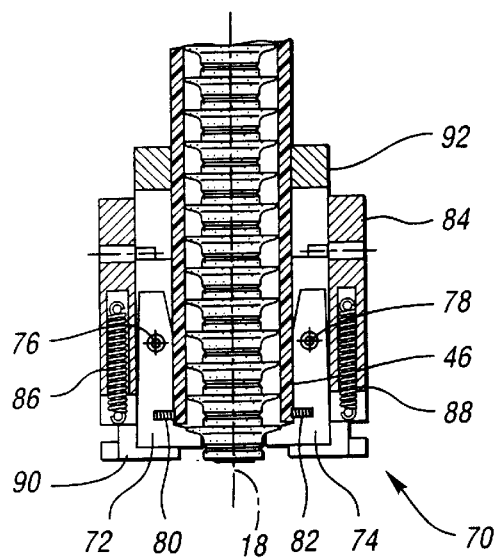
FIG. 6 shows a partial longitudinal cross-sectional view of the dispensing end of a loaded tube assembly in accordance with the embodiment of FIG. 1.

The dispensing assembly 70 is shown more clearly in FIGS. 1, 4 and 6. The dispensing assembly 70 includes pivotable feet 72,74 for selectively blocking the outlet end 46 of the hollow tube 12. The feet 72,74 are pivotable about the pivot pins 76,78, shown in FIG. 6 between the blocking position shown in FIG. 6 and the dispensing position shown in phantom in FIG. 4.

Referring to FIG. 6, compression springs 80,82 bias the feet 72,74 outward away from the central axis 18, away from the blocking position for dispensing inserts 16 through the outlet end 46. The compression springs 80,82 are compressed between the outlet end 46 of the tube 12 and the feet 72,74 for actuating pivotal movement of the feet 72,74 about the respective pivot pins 76,78. The feet 72,74 are held in the blocking position, shown in FIG. 6, by the sleeve 84 when the sleeve 84 is in its position nearest the outlet end 46 of the tube. The sleeve 84 is biased by the tension springs 86,88 toward this position nearest the outlet end 46 adjacent the end cap 90. When the sleeve 84 is moved upward, as viewed in FIG. 6, over the lower end fitting 92, the lower end of the sleeve 84 clears away from the feet 72,74, thereby allowing the compression springs 80,82 to force the feet 72,74 outward away from the blocking position to allow dispensing of inserts 16 from the outlet end 46 of the tube assembly 10.

As shown in FIGS. 9 and 10, the sleeve 84 is provided with pins 94,96 which travel within the slots 98,100 of the lower end fitting 92 as the sleeve 84 travels up and down to lock and unlock the outlet end 46 of the tube 12 by selectively blocking pivotal movement of the feet 72,74.

The weight assembly 54 is configured to maintain a consistent orientation while sliding along the hollow tube 12 such that the lower contact surface 58 maintains its orientation perpendicular to the central axis of the tube 12. As the inserts 16 are dispensed from the outlet end 46 of the tube assembly 10, the weight assembly 54 slides down the tube 12 such that the weight of the weight assembly 54 continues to compress the stack of inserts 16 together to maintain proper orientation of each insert 16.

While the preferred embodiment of the invention has been illustrated and described, it is not intended that this embodiment illustrate and describe all possible forms of the invention. Rather, it is intended that the following claims cover all modifications and alternative designs, and all equivalents, that fall within the spirit and scope of this invention.

What is claimed is:

1. An apparatus for dispensing identical pieces, comprising:
    a hollow tube having an internal cavity for housing and guiding a plurality of the pieces aligned one after another therein, the hollow tube having a central axis;
    a receiving assembly positioned at an inlet end of the hollow tube for receiving the pieces and having at least one pivotable blocking member for selectively blocking the inlet end of the hollow tube;
    a weight assembly positioned within the hollow tube, the weight assembly having a lower contact surface spanning substantially the entire width of the cavity and abutting against the one of the pieces nearest the inlet end, and the weight assembly being configured to maintain a proper orientation while sliding along the hollow tube such that the lower contact surface remains perpendicular to the central axis, thereby maintaining proper orientation of the plurality of pieces within the hollow tube;
    a dispensing assembly at an outlet end of the hollow tube opposite the inlet end for dispensing the pieces;
    wherein the weight assembly comprises a lower portion including the lower contact surface, and an upper portion movably connected with respect to the lower portion, the upper portion and lower portion being spring-biased away from each other; and
    a shoulder bolt operatively connecting the upper and lower portions to allow relative movement therebetween.

2. The apparatus of claim 1, wherein the weight assembly is spring-loaded against the blocking member when the plurality of pieces substantially fill the hollow tube.

3. The apparatus of claim 1, wherein the blocking member comprises at least one pivotable finger spring-loaded toward the position blocking the inlet end, the pivotable finger being movable away from the position blocking the inlet end to allow insertion of the pieces into the hollow tube.

4. The apparatus of claim 1, wherein the dispensing assembly comprises at least one pivotable foot for selectively blocking the outlet end, and a sleeve slidably positioned around the tube for movement between a closed position securing the foot in the position blocking the outlet end and an open position allowing pivotal movement of the foot away from the position blocking the outlet end.

5. The apparatus of claim 4, wherein the foot is spring-loaded away from the position blocking the outlet end and the sleeve is spring-loaded toward the closed position.

6. The apparatus of claim 1, further comprising a loader assembly including a brace for supporting the hollow tube and a compression spring extendable into the hollow tube through the outlet end for forcing the plurality of pieces against the receiving assembly as the pieces are loaded into the hollow tube.

7. An apparatus for dispensing identical pieces, comprising:
- a hollow tube having an internal cavity for housing and guiding a plurality of the pieces aligned one after another therein, the hollow tube having a central axis;
- a receiving assembly positioned at an inlet end of the hollow tube for receiving the pieces and having at least one blocking member for selectively blocking the inlet end of the hollow tube;
- a weight assembly slidingly positioned within the hollow tube and abutting the one of the pieces nearest the inlet end for compressing the plurality of pieces together to maintain proper orientation of each of the plurality of pieces;
- a dispensing assembly at an outlet end of the hollow tube opposite the inlet end for dispensing the pieces; and
- a loader assembly including a brace for supporting the hollow tube and a compression spring extendable into the hollow tube through the outlet end for forcing the plurality of pieces against the receiving assembly as the pieces are loaded into the hollow tube.

8. The apparatus of claim 7, wherein the weight assembly is springloaded against the blocking member when the plurality of pieces substantially fill the hollow tube.

9. The apparatus of claim 7, wherein the blocking member comprises at least one pivotable finger spring-loaded toward the position blocking the inlet end, the pivotable finger being movable away from the position blocking the inlet end to allow insertion of the pieces into the hollow tube.

10. The apparatus of claim 7, wherein the weight assembly comprises a lower portion abutting the one of the pieces nearest the inlet end, and an upper portion movably connected with respect to the lower portion, the upper and lower portions being spring-biased away from each other.

11. The apparatus of claim 10, further comprising a shoulder bolt operatively connecting the upper and lower portions to allow relative movement therebetween.

12. The apparatus of claim 7, wherein the dispensing assembly comprises at least one pivotable foot for selectively blocking the outlet end, and a sleeve slidably positioned around the tube for movement between a closed position securing the foot in the position blocking the outlet end and an open position allowing pivotal movement of the foot away from the position blocking the outlet end.

13. The apparatus of claim 12, wherein the foot is spring-loaded away from the position blocking the outlet end and the sleeve is spring-loaded toward the closed position.

14. An apparatus for dispensing sandwich panel inserts, comprising:
- a hollow tube having an internal cavity for housing and guiding a plurality of the inserts aligned one after another therein, the hollow tube having a central axis;
- a receiving assembly positioned at an inlet end of the hollow tube for receiving the inserts and having at least one blocking member for selectively blocking the inlet end of the hollow tube;
- a weight assembly slidably positioned within the hollow tube and abutting the one of the inserts nearest the inlet end for compressing the plurality of inserts together to maintain proper orientation of each of the plurality of inserts;
- a dispensing assembly at an outlet end of the hollow tube opposite the inlet end for dispensing the inserts; and
- wherein the dispensing assembly comprises at least one pivotable foot for selectively blocking the outlet end and a sleeve slidably positioned around the tube for movement between a closed position securing the foot in the position blocking the outlet and an open position allowing pivotal movement of the foot away from the position blocking the outlet end.

15. The apparatus of claim 14, wherein the weight assembly is spring-loaded against the blocking member when the plurality of inserts substantially fill the hollow tube.

16. The apparatus of claim 14, wherein the blocking member comprises at least one pivotable finger spring-loaded toward the position blocking the inlet end, the pivotable finger being movable away from the position blocking the inlet to allow insertion of the inserts into the hollow tube.

* * * * *